United States Patent Office 3,517,779
Patented June 30, 1970

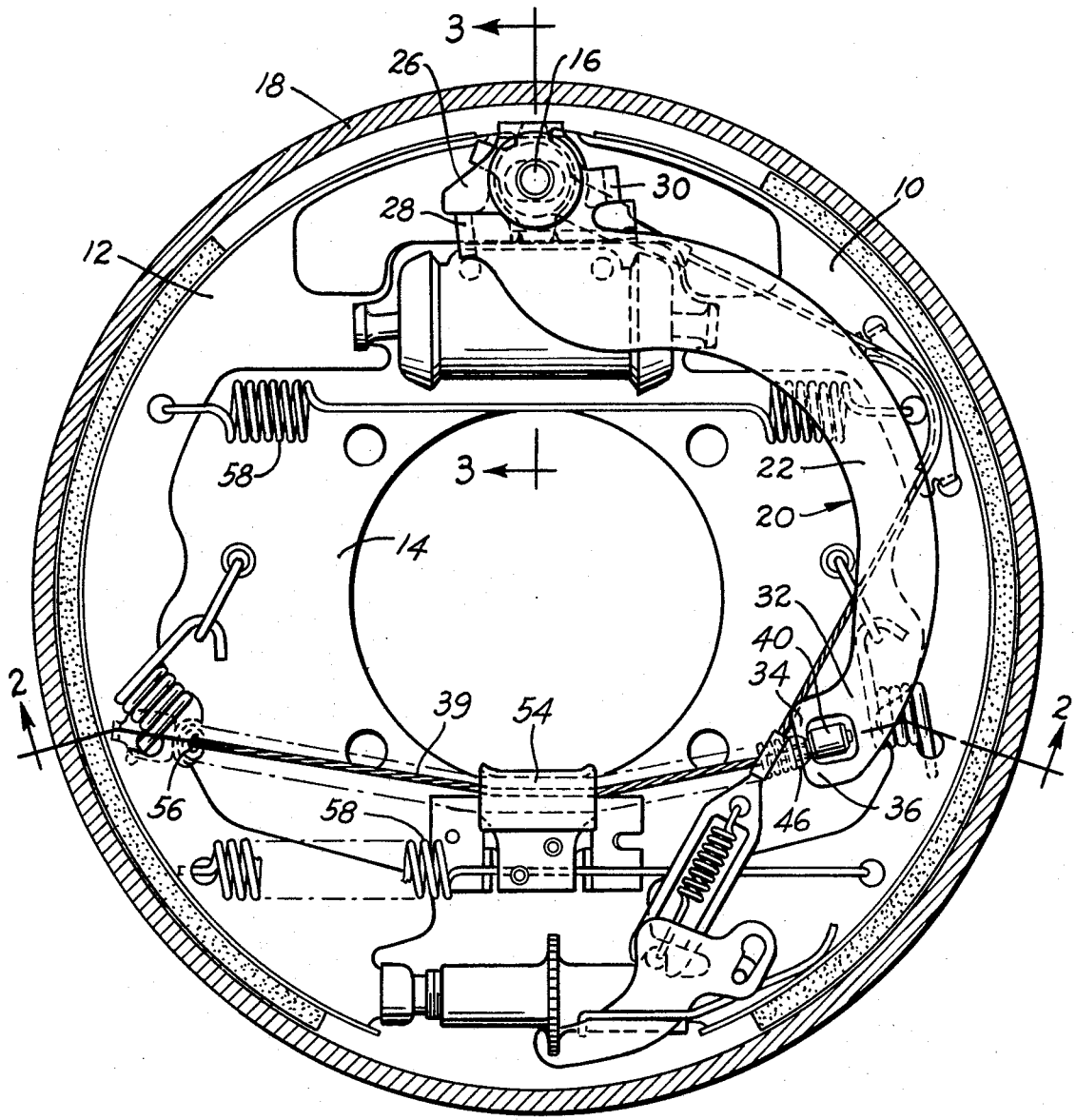
FIG_1

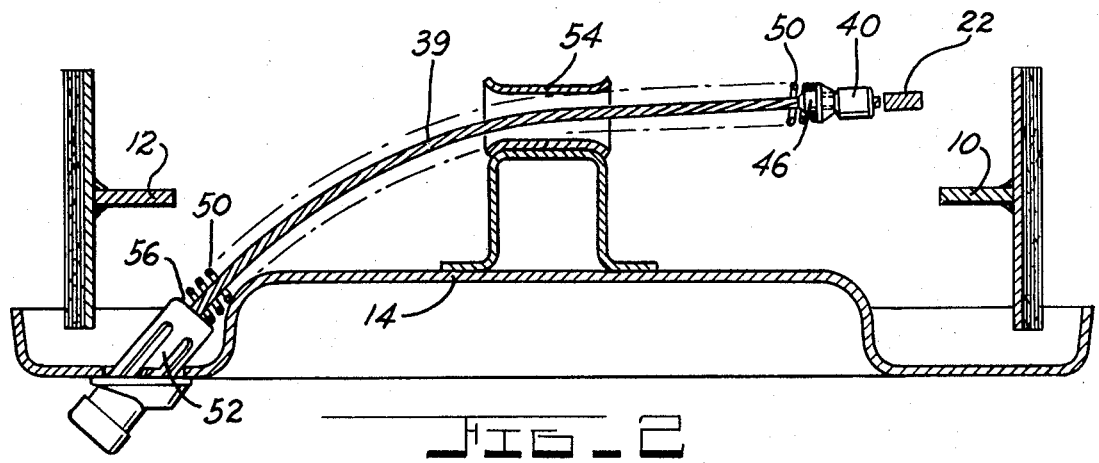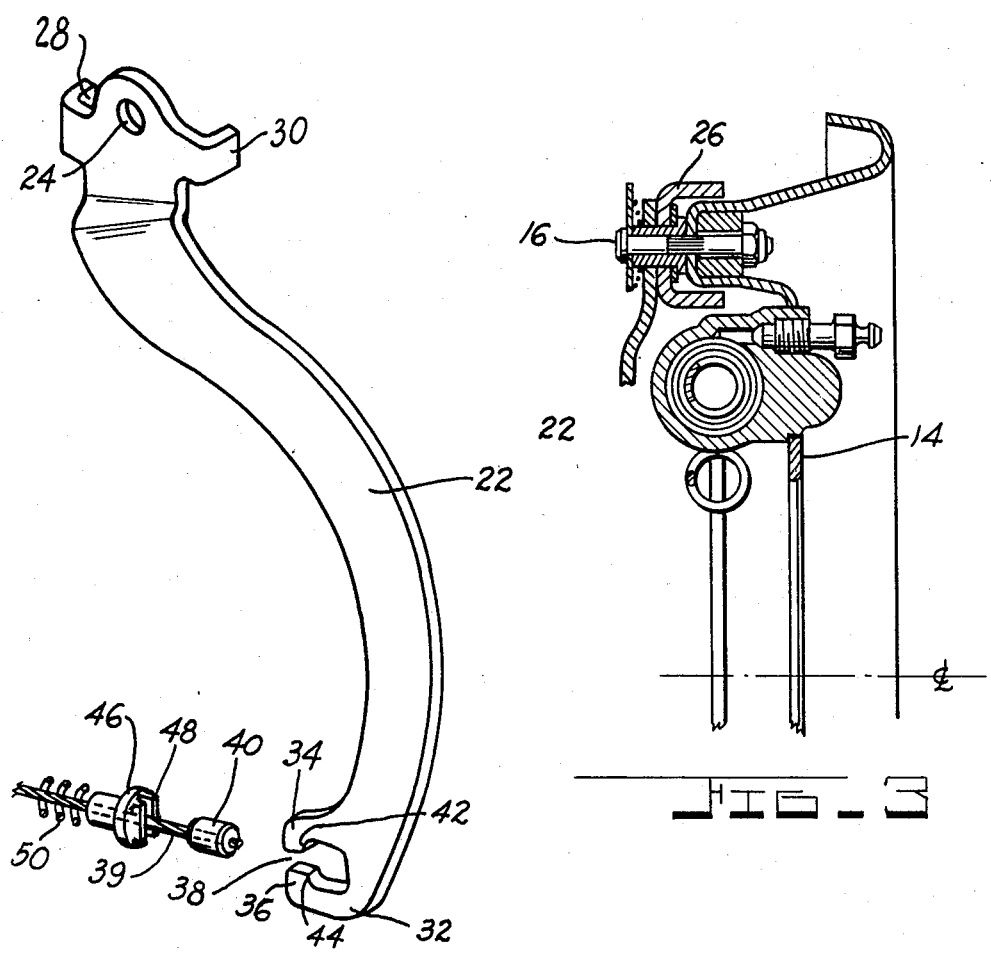

---

3,517,779
PARKING BRAKE LEVER
Daniel L. Bolenbaugh, South Bend, Ind., assignor to The Bendix Corporation, a corporation of Delaware
Filed Oct. 15, 1968, Ser. No. 767,757
Int. Cl. F16d 51/22; F16c 1/12
U.S. Cl. 188—78                     4 Claims

ABSTRACT OF THE DISCLOSURE

The invention relates to a parking brake lever means comprised of an arcuate body portion which on one end is operatively connected to friction members to move them into contact with a rotating member to accomplish a braking application. Said arcuate body has formed on its other end pincer-like arms having a gap therebetween which in cooperation with a guide means, retain a force transmitting means.

BACKGROUND OF THE INVENTION

The invention relates specifically to a parking brake lever for use in association with braking systems. However, it is felt that the invention is sufficiently broad in concept to facilitate its use for any application where a lever means is required.

The conventional parking brake levers with which I am familiar are formed, on the end to which the force transmitting means or cable is attached, with one or more depending flanges having a slot or opening therein to receive said cable. The conventional levers with their depending flanges are costly to manufacture and unnecessarily space consuming in view of the limited availability of space in a brake assembly. Moreover, the cost of manufacturing and space restrictions associated with existing designs, aggravated by the next generation braking systems being more sophisticated, and thus, requiring additional hardware with no increase in packaging area, dictate that improvements be made over the prior designs.

SUMMARY OF THE INVENTION

It is an object of this invention to provide a parking brake lever means that is of such a design that it may be used in association with a brake assembly having limited space availability for same.

It is an object of this invention to provide a parking brake lever means of simplified construction that is relatively easy to install and maintenance free.

It is an object of this invention to provide a parking brake lever means that is relatively inexpensive to manufacture.

It is an object of this invention to provide a parking brake lever means of such a configuration that it is readily adaptable to a plurality of different assemblies.

BRIEF DESCRIPTION OF THE DRAWINGS

FIG. 1 is a plan view of a brake having the invention installed therein;
FIG. 2 is a section view taken on line 2—2 of FIG. 1;
FIG. 3 is a section view taken on line 3—3 of FIG. 1; and
FIG. 4 is an isometric view of the parking brake lever shown in FIG. 1.

DESCRIPTION OF THE PREFERRED EMBODIMENT

As shown in FIG. 1, arcuate brake shoes 10 and 12 are operatively connected to each other and a backing plate 14 through an anchor member 16, and are responsive to being spread into frictional engagement with a rotatable drum 18 by either mechanical or hydraulic actuation. This invention is primarily concerned wtih mechanically applying the shoes to obtain "parking" braking.

The parking brake in FIG. 1 is indicated generally by reference numeral 20. The parking brake consists of a lever means 22 which has on one end a bore 24 (see FIG. 4) for pivotally attaching said lever means 22 to said anchor member 16. A cam 26 is operatively interposed between depending flanges 28 and 30 of said lever means 22 for engagement respectively, with brake shoes 10 and 12. At the applying end 32 of the lever means 22 there are formed pincer-like arms 34 and 36 having a gap 38 therebetween. To rotate the lever means 22 there is provided a force transmitting means or cable 39 which passes through said gap 38 and has a boss 40 rigidly secured to its end. The boss 40 abuts the inner shoulders 42 and 44 of pincer-like arms 34 and 36, respectively. A guide means 46 has a bore which allows for its installation around said cable 39. Said guide means 46 further includes a slot 48 for abutting against pincer-like arms 34 and 36. A resilient means or spring 50 is suitably installed around cable 39 to abut said guide means 46. As may be seen best in FIG. 2, the spring 50 is compressed or preloaded against guide means 46 by cable shield 52 which itself is rigidly fixed to the backing plate 14. The preloading of spring 50 against the guide means 46 precludes disengagement of the guide means from the pincer-like arms 34 and 36 as well as insures return of said lever means 22 to the brake-released position upon release of any brake application. It is further noted that an additional guide 54 may be used to route the cable away from the innermost periphery of the backing plate where the vehicle axle (not shown) would project axially into the brake assembly.

As may be seen in FIG. 4, the parking brake lever is flat on its applying end 32, and thus, its thickness is determined by the guide means 46 whose overall diameter need not be larger than the outside diameter of the spring 50. In contrast to the conventional parking brake levers, the thickness of the applying end 32 of the lever means 22 has been substantially reduced, if not minimized, which allows its use in brake assemblies where component densities and structural interferences would otherwise prevent reliable parking brake performance. Moreover, from a consideration of the construction of the parking brake lever, it will be seen that bends are not required to fabricate the applying end 32 of the lever means 22. Thus, it has been found advantageous to manufacture this lever by a single stamping operation wherein a significant cost reduction per lever assembly is possible. It will thus be seen that the present parking brake lever invention is an improvement over prior braking levers, not only in its design and operation but also in its manufacture.

MODE OF OPERATION OF THE PREFERRED EMBODIMENT

The parking brake is operated by pulling on the cable 39 through a handle or pedal (not shown) which is readily accessible to the operator of the vehicle. The cable is drawn through the opening 56 and the lever means 22 is pivoted in a clockwise direction as seen best in FIG. 1, thus applying the brake shoes 10 and 12. As the lever means 22 is turned to apply the brake shoes, the spring 50 is compressed between guide means 46 and cable shield 52 so that when the parking brake is released, the spring 50 returns the lever means 22 to its original position, thus permitting the return spring 58 to retract the brake shoes to their normal position.

Although the invention has been described in connection with a single example embodiment it will be apparent to those skilled in the art that the principles of the invention are susceptible of numerous applications with devices other than the specific selected embodiment.

I claim:
1. In a brake:
   a drum mounted for rotation with a member to be braked;
   a fixed support;
   a pair of brake shoes slidably mounted on said fixed support;
   a lever pivotally mounted on said fixed support operatively engaging each of said shoes to force the latter against the drum upon pivoting of the lever;
   said lever having an elongated web portion and a bifurcated end portion presenting a pair of pincer-like arms defining a gap therebetween;
   said pincer-like arms and said web portion being disposed in a common plane to form a substantially flat lever;
   a cable having a boss on one end thereof positioned in said gap; and
   guide means slidably carried on said cable in abutting relationship to said pincer-like arms to thereby releasably retain said cable and boss operatively connected to said lever.
2. The invention of claim 1:
   each of said arms having abutments extending inwardly into said gap toward one another;
   said boss engaging one side of said abutments;
   said guide means engaging the other side of said abutments.
3. The invention of claim 2:
   said guide means having a bore slidably receiving said cable and a transversely extending slot adapted to slidably engage said abutments.
4. The invention of claim 3; and
   resilient means carried by said cable yieldably urging said locking member into engagement with said abutments.

References Cited

UNITED STATES PATENTS

| 1,924,046 | 8/1933 | Apple. | |
| 1,994,434 | 3/1935 | Parker et al. | |
| 2,924,116 | 2/1960 | Abbott | 74—501 X |
| 3,064,767 | 11/1962 | Wiger | 188—78 |

FOREIGN PATENTS

| 36,865 | 5/1930 | France. |

GEORGE A. HALVOSA, Primary Examiner

U.S. Cl. X.R.

74—501